(12) United States Patent
Young et al.

(10) Patent No.: US 11,398,150 B2
(45) Date of Patent: Jul. 26, 2022

(54) NAVIGATION ANALYSIS FOR A MULTI-LANE ROADWAY

(71) Applicant: Verizon Patent and Licensing Inc., Arlington, VA (US)

(72) Inventors: Kristen Sydney Young, Morris Plains, NJ (US); Jyoti Bali Sharma, Short Hills, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 205 days.

(21) Appl. No.: 16/527,732

(22) Filed: Jul. 31, 2019

(65) Prior Publication Data

US 2021/0035443 A1      Feb. 4, 2021

(51) Int. Cl.
   *G08G 1/01*      (2006.01)
   *G01C 21/36*     (2006.01)
   *G08G 1/16*      (2006.01)

(52) U.S. Cl.
   CPC ....... *G08G 1/0145* (2013.01); *G01C 21/3658* (2013.01); *G08G 1/0116* (2013.01); *G08G 1/0141* (2013.01); *G08G 1/167* (2013.01)

(58) Field of Classification Search
   None
   See application file for complete search history.

(56) References Cited

U.S. PATENT DOCUMENTS

| | | | |
|---|---|---|---|
| 2018/0261082 A1* | 9/2018 | Shen | G08G 1/0141 |
| 2018/0365994 A1* | 12/2018 | Song | G05D 1/0223 |
| 2019/0138024 A1* | 5/2019 | Liang | G06K 9/6273 |
| 2019/0187707 A1* | 6/2019 | Zheng | B60W 30/12 |
| 2019/0317523 A1* | 10/2019 | Cheung | G08G 1/096783 |
| 2020/0143175 A1* | 5/2020 | Tan | G06T 7/70 |

OTHER PUBLICATIONS

Medanic, Juraj V. et al., "Partitioned lane assignment strategies for balancing excess lane capacity on AHS," Proceedings of 1995 American Control Conference—ACC'95, Seattle, WA, USA, 1995, IEEE, vol. 5, pp. 3581-3585 (Year: 1995).*

Bauza, R. et al., "Traffic congestion detection in large-scale scenarios using vehicle-to-vehicle communications," Mar. 3, 2012, Elsevier, Journal of Network and Computer Applications 36, pp. 1295-1307 (Year: 2012).*

* cited by examiner

*Primary Examiner* — Aniss Chad
*Assistant Examiner* — Madison R Hughes

(57) ABSTRACT

A navigation platform may receive, from a roadside unit, traffic data associated with a section of a roadway, wherein the section includes a plurality of lanes. The navigation platform may identify, from the traffic data and using a first model, lane data associated with a lane of the plurality of lanes. The navigation platform may determine, based on the lane data, vehicle information associated with the lane, wherein the vehicle information indicates a quantity of vehicles in the lane. The navigation platform may determine a lane occupancy of the lane based on the quantity of vehicles and a capacity of the lane. The navigation platform may determine that a target vehicle is approaching the section. The navigation platform may select, using a second model, a target lane from the plurality of lanes. The navigation platform may perform an action associated with enabling the target vehicle to navigate to the target lane.

20 Claims, 8 Drawing Sheets

NAVIGATION ANALYSIS FOR A MULTI-LANE ROADWAY

BACKGROUND

Image capture devices (e.g., cameras and/or devices associated with cameras) can capture images of one or more environments, locations, etc. and generate image streams (e.g., video) that can be streamed to and/or recorded by one or more devices. For example, a surveillance camera (e.g., a traffic camera, security camera, a doorbell camera, and/or the like) can be used to monitor a roadway to permit traffic and/or events (e.g., vehicle collisions, construction events, and/or the like) to be monitored. Additionally, or alternatively, a sensor (e.g., radar sensors, lidar sensors, and/or the like) can obtain measurements of one or more environments, locations, etc. and provide the measurements to permit the roadway to be monitored. In some cases, multiple surveillance cameras and/or sensors can be used to monitor particular sections of the roadway from various positions.

DETAILED DESCRIPTION

Figure 1A:
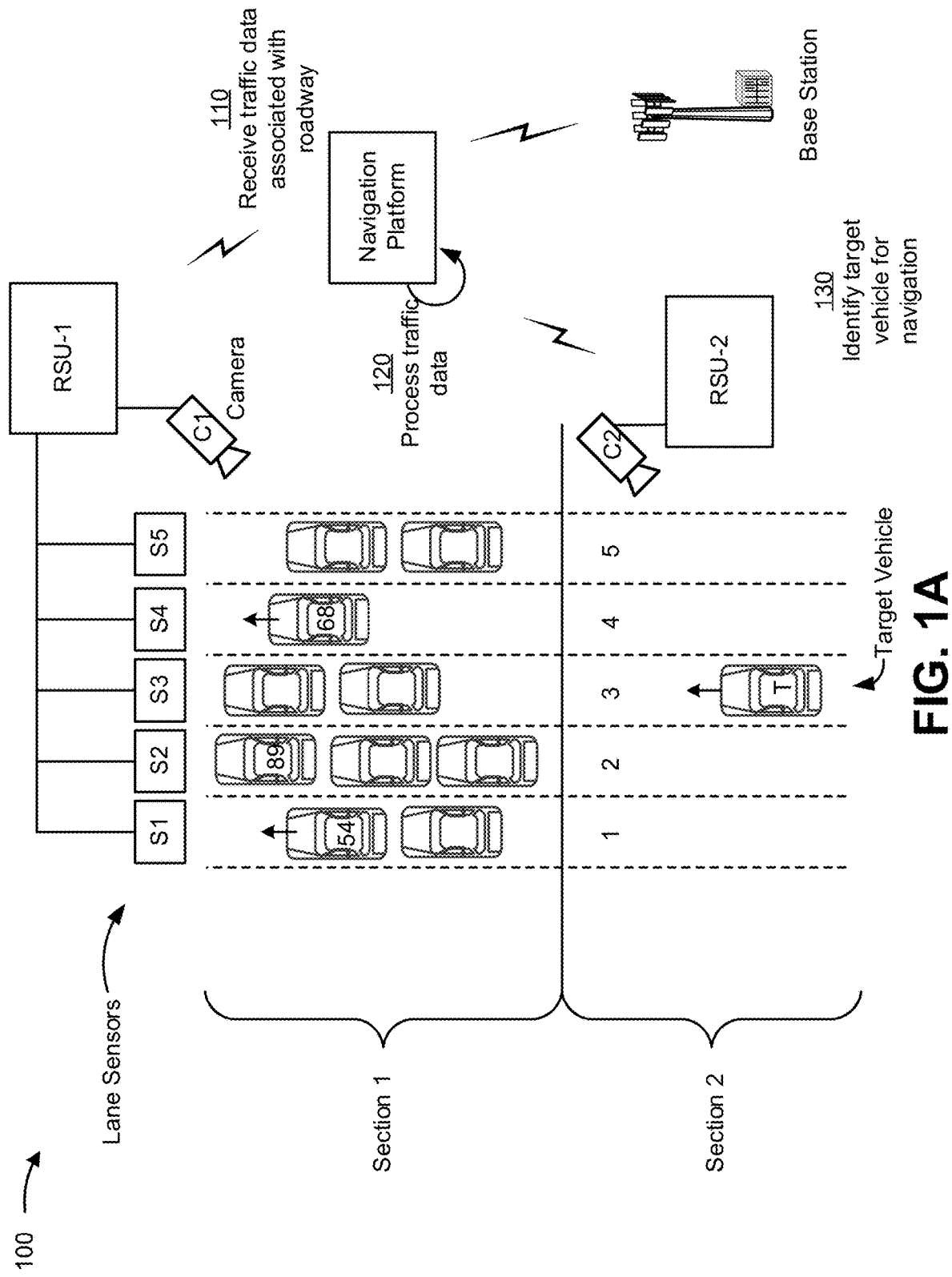
FIGS. 1A-1C are diagrams of one or more example implementations described herein.

The following detailed description of example implementations refers to the accompanying drawings. The same reference numbers in different drawings may identify the same or similar elements.

In many instances, a navigation platform can provide navigation instructions to a device to enable navigation of a vehicle along a roadway. For example, the navigation platform may provide navigation instructions to a user device (e.g., a mobile device, such as a smartphone), a console of the vehicle (e.g., to permit the navigation instructions to be displayed to the user), a control device of the console (e.g., to permit the navigation instructions to be used to control the vehicle), and/or the like. Furthermore, in many instances, certain sections of the roadway may include multiple lanes (which may be referred to herein as a multi-lane roadway and/or a multi-lane section of a roadway) to travel in a same direction or toward a same destination. Furthermore, vehicles may travel at different rates across different lanes due to traffic conditions of the individual lanes. For example, if there are multiple vehicles in a particular lane, the vehicles in that lane may tend to travel at a slower rate than a lane that has fewer vehicles. However, according to previous techniques, the navigation platform cannot provide navigation instructions to a device to enable the vehicle to navigate to a particular lane of traffic (e.g., to balance and/or optimize lane occupancy).

According to some implementations described herein, a navigation platform is to (or is configured to) analyze traffic data associated with a multi-lane roadway to enable multi-lane navigation on the roadway. In some implementations, the navigation platform may receive the traffic data, analyze the traffic data (e.g., using a model) to determine vehicle information, determine respective lane occupancies of the lanes of the roadway, select which of the lanes that a target vehicle should navigate toward (e.g., to balance the lane occupancies and/or enable navigation of the target vehicle to a particular destination in a shortest amount of time), and provide navigation instructions to the target vehicle to permit the target vehicle to navigate toward the selected lane and/or to the selected lane. The traffic data may include image data from one or more cameras (or other types of image capture devices) and/or sensor data from one or more sensors that are positioned to monitor the roadway. The vehicle information may be determined from the traffic data and/or from information received from the vehicles in the roadway, sensor data from one or more vehicle sensors, and/or vehicle information from the vehicles in the roadway.

In this way, the navigation platform may facilitate multi-lane navigation on a multi-lane roadway, which enables efficient use of the roadway (e.g., through balancing the lane occupancies of the lanes), may enable efficient travel (e.g., by preventing a waste in fuel consumption and/or power consumption of batteries of the vehicles), may enhance the user experience (e.g., by improving timeliness of travel), and so on. Furthermore, the navigation platform, via one or more processes described herein, may improve safety of travel along a multi-lane roadway. For example, a user (e.g., an operator of a vehicle) and/or vehicle (e.g., an autonomous vehicle) that seeks to merge to a faster lane of travel (e.g., a lane that is travelling at a faster rate and/or is less occupied than a current lane of travel of the vehicle), may receive navigation instructions to permit the vehicle to navigate to the faster lane of travel prior to being slowed to a slower rate in the current lane of the vehicle. Accordingly, rather than having to make a sudden decision and/or suddenly accelerate the vehicle to reach a speed of travel of a faster moving lane, the navigation platform may provide navigation instructions to the user and/or vehicle to permit the vehicle to merge to a particular lane ahead of time. Therefore, the navigation platform, as described herein, may reduce an opportunity for catastrophic events (e.g., vehicle collisions) that could be caused by making sudden decisions and/or accelerations of the vehicle.

Figure 1B:
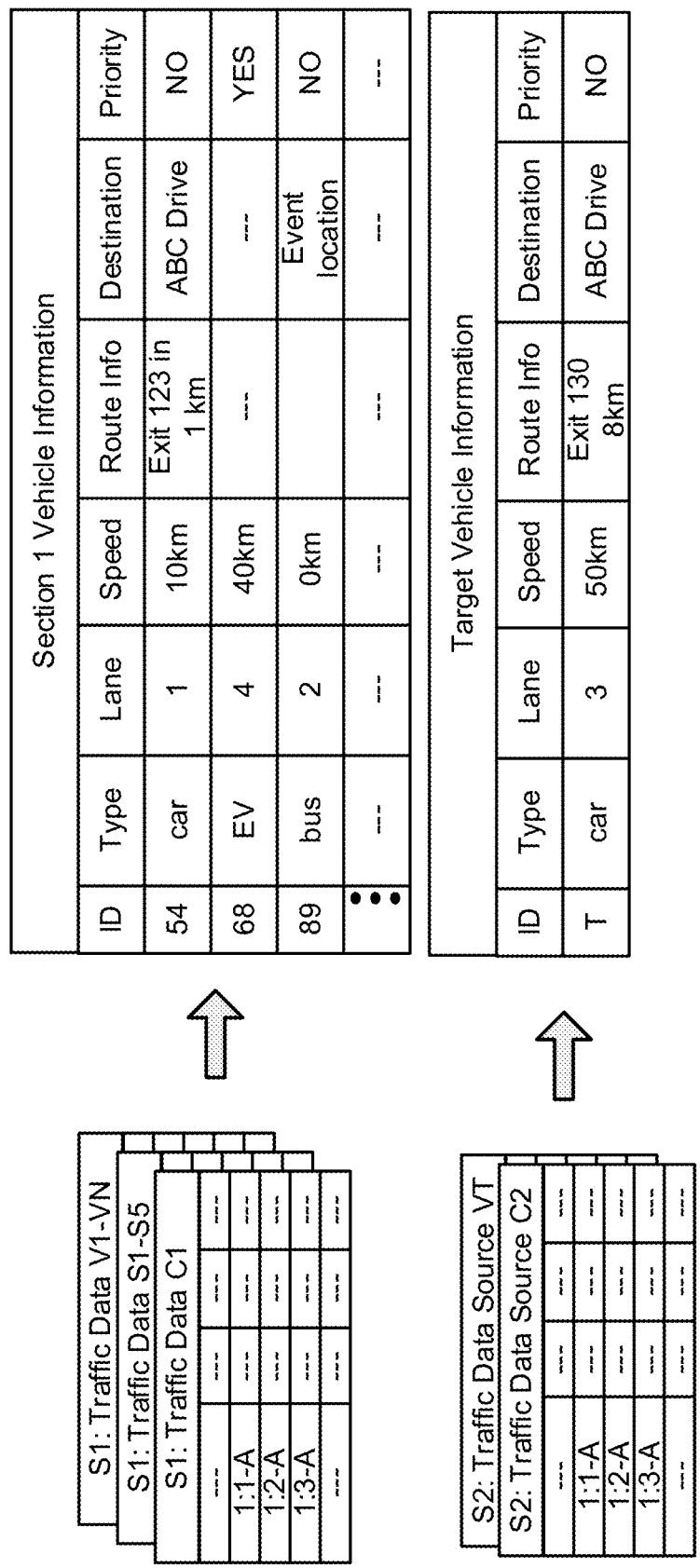
Figure 1C:
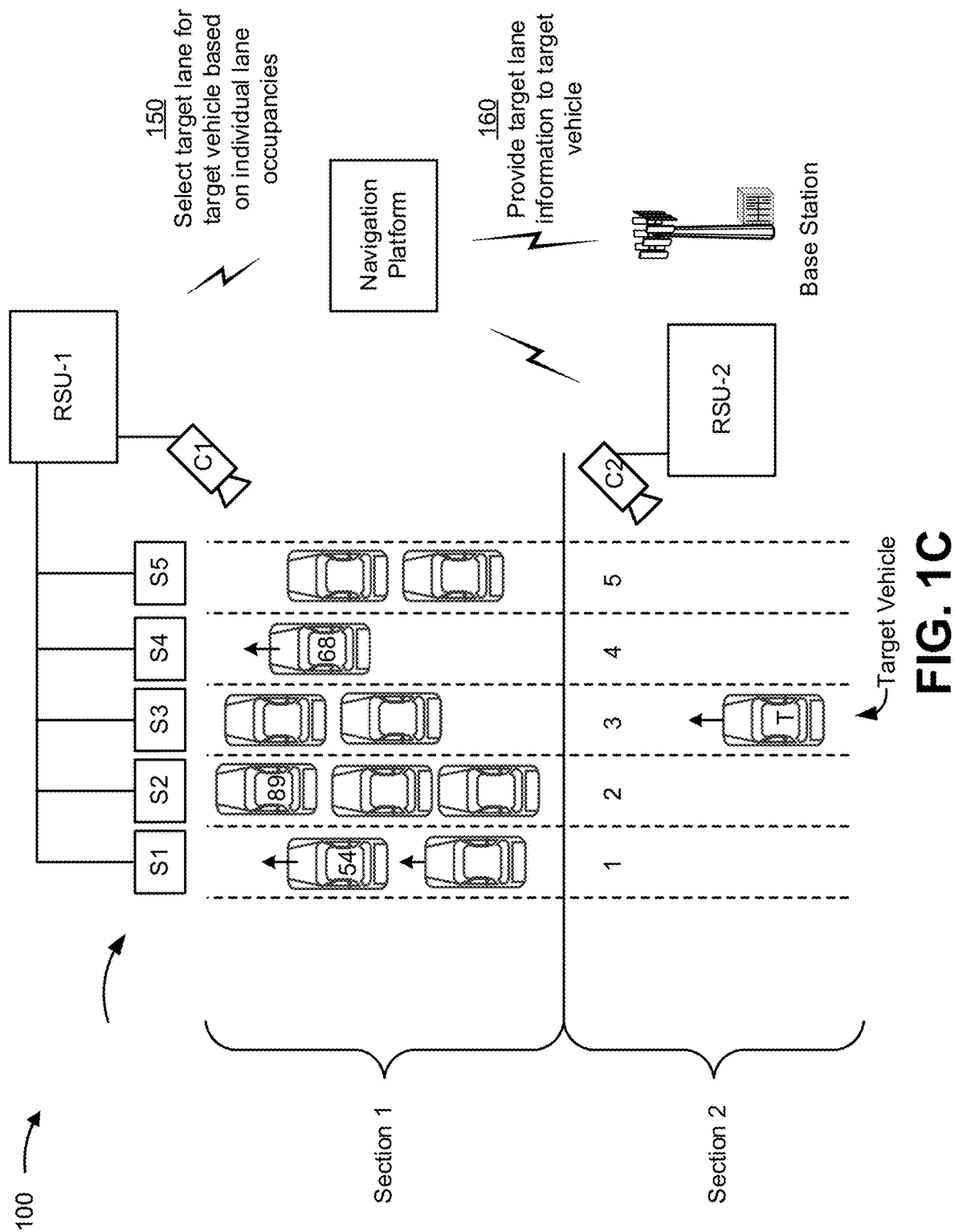

FIGS. 1A-1C is a diagram of an example implementation 100 described herein. Example implementation 100 includes a navigation platform, a base station, roadside units (RSUs) (shown as "RSU-1" and "RSU-2" and referred to collectively as "the RSUs"), one or more cameras (shown as "C1" and "C2" and referred to collectively as "the cameras"), one or more sensors (shown as "S1-S5" and referred to collectively as "the sensors"), a plurality of vehicles in a first section (shown as "Section 1") of a roadway, and a target vehicle (shown as "T") in a second section (shown as "Section 2") of the roadway. As described herein, the cameras and/or the sensors provide traffic data to the RSUs and/or navigation platform to permit the navigation platform to provide navigation information to the target vehicle based on the positions of the plurality of vehicles in the lanes (numbered 1-5) of the first section.

As described herein, Section 1 and Section 2 of the roadway may be distinguishable according to any suitable manner. For example, Section 1 may be distinguished from Section 2 based on being sections of the roadway that are monitored by different sets of traffic data collectors (e.g., particular sets of sensors and/or cameras). Additionally, or alternatively, Section 1 and Section 2 may be predefined sections of the roadway (e.g., sections with predefined barriers). In some implementations, Section 1 and Section 2 may be variable and/or changing sections with changing barriers. For example, Section 1 and Section 2 may be defined according to an expected average speed (e.g., which may correspond to a speed limit for the roadway) in order to account for vehicle mobility, speed of travel, and/or the like. Additionally, or alternatively, in one implementation Section 1 and Section 2 may be considered to be within (or to be) a single section. As shown in example implementation 100, Section 1 and Section 2 are adjacent sections of the roadway. In other examples, Section 1 and Section 2 may not be adjacent sections of a roadway, and/or portions of Section 1 and Section 2 may overlap one another.

As shown in FIG. 1A, and by reference number 110, the navigation platform receives traffic data associated with the roadway. As described herein, the traffic data may include data that is representative of the traffic on the roadway. The RSUs and/or the navigation platform may collect the traffic data from the cameras and/or the sensors. The cameras may each be any suitable camera that is capable of providing one or more images within an image stream (e.g., similar to a video surveillance camera, an internet protocol (IP) camera, and/or the like). Accordingly, the cameras may provide real-time images to the RSUs and/or navigation platform to permit the navigation platform to determine a real-time status of the roadway (e.g., a traffic status according to the quantity and/or type of vehicles in the roadway), as described herein. Additionally, or alternatively, the RSUs may local process images and provide any corresponding data to the navigation platform. The sensors may be any suitable sensors, such as motion sensors, infrared light sensors, temperature sensors, vibration sensors, microphones, radio detection and ranging sensors ("radar sensors"), ultrasonic sensors, light detection and ranging sensors ("lidar sensors"), and/or the like. The sensors may provide signals and/or measurements (e.g., values representative of a location and/or speed of a vehicle) to the RSUs and/or navigation platform to permit the navigation platform to determine a real-time status of the roadway.

As described herein, the traffic data may include image data. For example, the navigation platform (e.g., via the RSUs) may receive images from the cameras. The cameras may be set up to capture (e.g., continuously during a particular time period) the images of the roadway. As shown, a first camera (shown as "C1") may be configured to capture images of Section 1 and a second camera (shown as "C2") may be configured to capture images of Section 2. In some implementations, one or more additional cameras may be included and/or one of the cameras may be configured to monitor both sections of the roadway in example implementation 100.

In some implementations, the cameras may be configured to capture images using the one or more sensors to detect a particular event (e.g., based on detected movement, sounds, and/or the like). Additionally, or alternatively, the cameras may be positioned at various locations such that the image capture devices are configured to capture images of the roadway from various positions (e.g., with different geographical locations, different orientations, different angles and/or different views). Each of the cameras may provide the one or more images within an image stream (e.g., similar to a video surveillance camera, an internet protocol (IP) camera, and/or the like) to permit the RSUs and/or the navigation platform to have access to a real-time view of the roadway.

As described herein, the traffic data may include sensor data. For example, the navigation platform (e.g., via the RSUs) may receive measurements from the sensors. The measurements from the sensors may include information associated with objects (e.g., vehicles, individuals, and/or the like) in the lanes of the roadway. For example, the sensors may be configured to detect a vehicle, measure locations of the vehicle (e.g., determine that the vehicle is in a particular lane of Section 1), and provide corresponding measurements to the RSU and/or navigation platform. More specifically, using radar signals and/or lidar signals, the sensors may detect the vehicles in Section 1, measure respective positions of the vehicles in Section 1, measure respective speeds of the vehicles in Section 1 (e.g., based on changes in positions of the vehicles), and/or the like. As described herein, such sensor data may be provided within the traffic data to permit the navigation platform to generate vehicle information for the vehicles in Section 1 (e.g., vehicles determined to be in a same group of traffic).

In some implementations, the sensors may be configured to monitor a particular lane of the roadway (or a section of the roadway). For example, as shown, each sensor may be configured to individually monitor a specific lane of the roadway. More specifically, S1 may be configured to detect only objects (and/or characteristics of objects) in (at least partially) lane 1, S2 may be configured to detect only objects in lane 2, S3 may be configured to detect only objects in lane 3, S4 may be configured to detect only objects in lane 4, and S5 may be configured to detect only objects in lane 5. The sensors may be configured to detect objects only in Section 1 or may be configured to detect objects in Section 1 and Section 2. The sensors may be positioned on any suitable structure (e.g., a bridge, a sign, and/or the like) that permits the sensors to monitor the multiple lanes (individually or collectively) of the roadway.

The RSUs may be configured to collect the traffic data from the cameras and/or sensors and provide the traffic data to the navigation platform for analysis. According to some implementations, the RSUs may be configured to control the cameras and/or sensors to generate the traffic data and/or provide the traffic data to the RSUs. In some implementations, the RSUs may be edge devices of an edge network associated with the base station. In some implementations, the RSUs may be communicatively coupled (e.g., via a wired or wireless connection) to a network (e.g., via the base station) to facilitate communication with the navigation platform (e.g., to forward the traffic data and/or receive instructions from the navigation platform).

Additionally, or alternatively, the RSUs may be communicatively coupled with the vehicles and/or user devices associated with the vehicles (e.g., user devices within the vehicles). In such cases, the RSUs may receive vehicle data from one or more of the vehicles on the roadway. Such vehicle data may include information identifying a speed associated with the vehicle, a speed associated with a nearby vehicle (e.g., using one or more camera systems or sensor systems (e.g., radar, lidar, and/or the like) of the vehicle) a location associated with the vehicle (e.g., a geographical location represented by geographical coordinates), a desired route associated with the vehicle, a destination of the vehicle, and/or the like. Such information may be provided from a navigation system associated with the vehicle, a navigation application of a user device of the vehicle, and/or the like.

According to some implementations, the RSUs may assemble and/or process the vehicle data and include the vehicle data as traffic data associated with the roadway. For example, the RSUs may sort, synchronize, and/or generate respective traffic data for the vehicles. Additionally, or alternatively, the navigation platform may receive such vehicle data from the vehicles and/or user devices associated with the vehicles (e.g., via the base station), without the vehicle data being provided or routed through the RSUs.

In some implementations, the traffic data may be received by the RSUs and/or provided to the navigation platform based on the cameras, the sensors, and/or the RSUs detecting the presence of one or more vehicles on the roadway. For example, based on the cameras and/or RSUs detecting movement (e.g., of an object) in images of the roadway, the cameras and/or RSUs may provide the traffic data to the navigation platform. Additionally, or alternatively, based on the sensors and/or RSUs detecting movement in measurements associated with the roadway (e.g., based on detected movement of an object in the images captured by the cameras, based on movement indicated in measurements from the sensors, and/or the like), the sensors and/or RSUs may provide the traffic data to the navigation platform.

In this way, the cameras and/or the sensors may provide traffic data to the RSU and/or navigation platform to permit the navigation platform to determine vehicle information associated with the vehicles in Section 1.

As further shown in FIG. 1A, and by reference number 120, the navigation platform processes the traffic data. For example, the navigation platform may process the traffic data to identify the vehicles in Section 1, the locations of the vehicles in Section 1 (e.g., the lanes of Section 1 within which the vehicles are located), speeds of the vehicles in Section 1, and/or the like. Additionally, or alternatively, the navigation platform may process the traffic data to detect and/or identify vehicles in Section 2, such as the target vehicle approaching Section 1. As described herein, the navigation platform may identify the vehicles, positions of the vehicles, and/or speeds of the vehicles to determine lane occupancies of the lanes of the roadway (and specifically, Section 1 in this example) to permit the navigation platform to select a target lane (e.g., an optimal lane according to a selection model described herein) for the target vehicle.

When processing the traffic data, the navigation platform may perform one or more operations associated with the traffic data to identify the individual vehicles on the roadway based on the traffic data. In some implementations, the navigation platform may synchronize the traffic data from the multiple sources (e.g., cameras, sensors, vehicles, user devices, RSUs, and/or the like) providing traffic data associated with Section 1 and/or vehicles in Section 1. As described herein, such data may include image data from the cameras, measurement data from the sensors, vehicle data associated with the vehicles, and/or the like. Further, the navigation platform may organize the traffic data (e.g., by vehicle, by lane, by section, and/or the like). In this way, the navigation platform may generate vehicle information associated with the vehicles of Section 1.

As described herein, the traffic data may include image data associated with images the roadway. In some implementations, the navigation platform may utilize a model, such as an image processing model, to analyze the images to detect the vehicles in the roadway. For example, the image processing model may be configured or trained to detect the vehicles in the roadway, as described herein. Furthermore, the image processing model may be configured or trained to detect the positions of the vehicles relative to the lanes of the roadway. Accordingly, the image processing model may be configured to identify the lanes and vehicles depicted in the images (e.g., using lane markings, such as dashed lines, dotted lines, and/or the like) in the roadway and determine in which lanes the vehicles are located. More specifically, from the images, the image processing model may determine a location of a vehicle (e.g., based on image coordinates of the images depicting the vehicle and translating the image coordinates to geographical coordinates of the roadway), determine that the location is in a particular lane, and, thereby, determine that the vehicle is in that lane. In this way, from the images captured by the cameras, the navigation platform may determine which vehicles in the roadway are in which lanes of the roadway, to permit the navigation platform to determine respective lane occupancies of the lanes of the roadway (e.g., of Section 1 of the roadway), as described herein.

In some implementations, the navigation platform (or image processing model of the navigation platform) utilizes one or more artificial intelligence techniques, including machine learning, deep learning, neural networks, and/or the like to identify one or more objects (e.g., vehicles, types of vehicles, individuals, features of roadways (e.g., lanes, types of lanes, traffic signs, traffic indicators, and/or the like), and/or the like. For example, the navigation platform may use a computer vision technique, such as a convolutional neural network technique to assist in classifying image data (e.g., image data including representations of vehicles (including particular types of vehicles), roadways, lanes, and/or the like) into a particular class. More specifically, the navigation platform may determine that a vehicle has a particular characteristic. Such a characteristic may include a particular identifier (e.g., a license plate, vehicle type indicator, associated entity (e.g., a law enforcement entity, a fire/rescue entity, medical emergency entity, a construction entity, a passenger transport entity, and/or the like), feature (e.g., a siren, a trailer, a cargo hold, and/or the like), a particular size and/or shape (e.g., a size and/or shape associated with a sedan, a coupe, a truck, a bus, a rescue vehicle, a law enforcement vehicle, a motorcycle, a moped, and/or the like), and/or the like. On the other hand, the navigation platform may determine, using the computer vision technique, that certain vehicles do not have a particular characteristic (and thus do not belong to a particular class of vehicles). Similarly, the navigation platform may determine that a section of roadway has or does not have a particular characteristic (e.g., a particular lane, a type of lane (e.g., a turn lane, a construction lane, a carpool lane, a designated passenger transportation lane, and/or the like).

Additionally, or alternatively, the computer vision technique may include using an image recognition technique (e.g., an Inception framework, a RESNET® framework, a Visual Geometry Group (VGG) framework, and/or the like), an object detection technique (e.g. a Single Shot Detector (SSD) framework, a You Only Look Once (YOLO®) framework, a cascade classification technique (e.g., a Haar cascade technique, a boosted cascade, a local binary pattern technique, and/or the like), and/or the like), an edge detection technique, an object in motion technique (e.g., an optical flow framework and/or the like), and/or the like. Additionally, or alternatively, the computer vision technique may include an image processing technique configured to analyze particular biometrics of an individual, such as a pedestrian, construction worker, and/or the like. For example, the computer vision technique may utilize facial recognition, gait detection/analysis, and/or the like to detect an individual within or along a roadway. In such cases, the navigation platform, when an individual is detected in a particular lane, may determine that the lane is not to be a target lane for any approaching target vehicles, as described herein (e.g., to minimize risking the safety of the individual in the lane).

In some implementations, as described herein, the navigation platform (e.g., via the image processing model) may determine whether an object can be identified within a roadway and/or within a lane of a roadway. For example, using information and/or images associated with a particular object, the navigation platform may determine whether an image depicts the particular object. In this case, the navigation platform may generate and/or utilize a machine learning model, such as an object detection model. For example, the navigation platform may train the object detection model using information and/or images that include a plurality of various objects, a plurality of various characteristics of various objects, and/or the like, to enable similar objects to be identified and/or detected within images (e.g., images from the cameras). In some implementations, more specifically, the navigation platform may generate, utilize, and/or train a particular type of object detection model to identify a particular type of object (e.g., a vehicle detection model, an individual detection model, a lane detection model, and/or the like) and/or a feature of an object (e.g., a law enforcement vehicle detection model, a rescue vehicle detection model, a construction vehicle detection model, and/or the like).

In some implementations, the navigation platform may use a scoring system (e.g., with relatively high scores and/or relatively low scores) to identify and/or classify objects as being associated with one another. More specifically, the navigation platform may determine that past characteristics of certain objects have a threshold probability of being associated with a particular object. In this case, the navigation platform may determine that a relatively high score (e.g., as being likely to be identified) is to be assigned to those characteristics that are determined to be the same or similar as previously identified characteristics of the particular object (or more frequently identified than past identified characteristics). In contrast, the navigation platform may determine that a relatively low score (e.g., as being unlikely to be identified) is to be assigned to characteristics of objects that are determined to be different than past identified characteristics of the particular object (or less frequently identified than past identified characteristics).

Accordingly, the object detection model may include or may be a machine learning model that is trained to detect a vehicle of example implementation 100 based on historical information associated with detecting one or more other vehicles that are associated with the vehicle (e.g., vehicles that are a same make/model, vehicles that are a same type, and/or the like). For example, the machine learning model may be trained based on training images that depict a plurality of vehicles and/or respective pluralities of different types of vehicles. In this way, an object detection model (e.g., of an image processing model of the navigation platform) may be configured to detect a vehicle depicted in images of the roadway that are related to and/or correspond to one or more vehicles depicted in the training images. Additionally, or alternatively, the object detection model may be used (e.g., by the image processing model) to indicate a lack of a vehicle on a roadway or within a lane of a roadway. For example, if the object detection model does not detect a vehicle (or other type of object) depicted in a particular lane or in a space of a particular lane, an image processing model associated with the object detection module may determine that that particular lane (and/or that certain space of the lane) is open or unoccupied by a vehicle. In this way, the navigation platform may use an object detection model to detect one or more vehicles in one or more lanes of the roadway and, correspondingly, a quantity of vehicles in one or more lanes of the roadway.

As described herein, the traffic data may include sensor data associated with sensor measurements configured to detect vehicles in the roadway. In some implementations, the navigation platform may utilize a model, such as a measurement analysis model, to analyze the measurements to detect the vehicles in the roadway and/or determine that certain measurements are associated with a same vehicle. For example, the measurement analysis model may be configured to identify patterns of measurements and/or patterns within the sensor data that indicate the presence of a vehicle, a position of the vehicle, movement of the vehicle and/or characteristics of the movement of the vehicle such as speed and/or direction of the vehicle. The measurement analysis model may be configured and/or trained to detect the patterns in order to determine that a vehicle is in the roadway, a location of the vehicle within the roadway, and/or a speed of the vehicle within the roadway. Additionally, or alternatively, the measurement analysis model may determine the types of measurements and/or types of sensors that are providing the measurements and analyze the measurements accordingly. In this way, the measurement analysis model may be specific to certain measurements or types of sensors. Moreover, the measurement analysis model may be trained according to certain positions of the sensors and/or positions of the sensors relative to each other, to permit the measurement analysis model to compare and/or analyze the measurements relative to which sensors provided the measurements in the traffic data. Accordingly, from the traffic data, the navigation platform (via a measurement analysis model), may be capable of identifying a vehicle in the roadway, determining a location of the vehicle in the roadway, and/or analyzing movement of the vehicle in the roadway.

In some implementations, the navigation platform may determine whether certain traffic data from different sources is associated with a same vehicle (or other type of object) based on images from the cameras, measurements from the sensors, and/or vehicle data from the vehicles (and/or user devices associated with the vehicles). For example, the navigation platform may correlate image data of a vehicle to vehicle data (e.g., a speed of travel, a route, a destination, and/or the like) associated with the vehicle. As a more specific example, the navigation platform may detect that vehicle 54 is in Section 1 from measurements (e.g., radar measurements, lidar measurements, and/or the like) from sensor S1. Based on detecting vehicle 54 in the measurements from sensor S1, the navigation platform may determine whether vehicle 54 is depicted in an image stream from camera C1 (referred to as "the C1 image stream"), and/or whether information associated with vehicle 54 is included in vehicle data received via RSU-1 and/or the base station. For example, the navigation platform may analyze the measurements from sensor S1 and determine whether the C1 image stream depicts a vehicle with corresponding characteristics (e.g., a same location, a same direction, a same speed, and/or the like) and/or whether the vehicle data includes information identifying corresponding characteristics of a vehicle. In this way, the navigation platform (and/or an object detection model) may identify whether a same vehicle is associated with traffic data received from multiple and/or separate sources based on determined movement characteristics of the vehicle.

Additionally, or alternatively, the navigation platform may determine that traffic data from different sources is associated with a particular vehicle based on the traffic data including a same identifier associated with the vehicle. For example, vehicle data from the vehicle (or a user device of the vehicle) may indicate that the vehicle is associated with a particular number (e.g., a license plate number, a call number associated with the vehicle (e.g., a law enforcement unit number, a bus number, and/or the like), and/or the like. In such a case, the navigation platform (e.g., via the image processing model and/or object detection module) may identify the call number on the vehicle (e.g., by identifying the license plate number, the call number, and/or the like depicted on the vehicle in the images). In this way, the navigation platform may determine that the vehicle data is associated with the same vehicle depicted in the images.

Accordingly, as described herein, the navigation platform may use various types of traffic data to determine particular vehicle information associated with a vehicle. For example, the navigation platform may use image data from the cameras to detect the lane of travel of the vehicle and various vehicle data associated with the vehicle to determine a speed of the vehicle, a route of the vehicle, a destination of the vehicle, and/or the like. Further, the navigation platform may sort and/or organize the traffic data according to vehicles on the roadway using vehicle information associated with the vehicles and determined from the sensor data, the image data, the vehicle data, and/or the like.

In this way, the navigation platform may process the traffic data to permit the navigation platform to determine a quantity of vehicles in the roadway (and/or in the specific lanes of the roadway) and/or corresponding lane occupancies of the roadway to permit the navigation platform to provide navigation instructions to the target vehicle based on the quantity of vehicles and/or lane occupancies.

As further shown in FIG. 1A, and by reference number 130, the navigation platform identifies the target vehicle for navigation. For example, the navigation platform may identify the target vehicle that is to receive navigation instructions to permit the target vehicle to navigate to a target lane of Section 1 (e.g., so that the target vehicle can travel through Section 1 in an optimal manner, as determined by a selection model, described herein). The navigation platform may detect the target vehicle based on the traffic data, as described herein. For example, the navigation platform may analyze images depicting Section 2 of the roadway, receive measurements obtained by sensors configured to monitor Section 2, and/or receive vehicle data associated with the target vehicle to determine that the target vehicle is in Section 2. Although the target vehicle is shown as a vehicle in Section 2 in example implementation 100, the target vehicle may correspond to one or more of the vehicles in Section 1 in other examples. In this way, the navigation platform may be configured to provide navigation instructions to any or all of the vehicles in Section 1 (e.g., to balance the lane occupancies of the lanes in Section 1).

In this way, because Section 2 may be situated before Section 1 relative to a direction of travel or designated route of the target vehicle, the navigation platform may determine that the target vehicle is approaching Section 1 of the roadway and/or that the navigation platform is to determine a target lane of travel for the target vehicle to permit the target vehicle to navigate to the target lane, as described herein.

As shown in FIG. 1B, and by reference number 140, the navigation platform determines vehicle information based on the processed traffic data. As described above, the navigation platform may generate the vehicle information based on the traffic data. As shown, the vehicle information may be sorted by section and/or by vehicle.

As shown in FIG. 1B, the navigation platform may generate and/or the determine the vehicle information based on mapping vehicle information to particular vehicles. As shown, the vehicle information, for each vehicle, may include an identifier of the vehicle, a type of the vehicle, a lane of travel of the vehicle, a speed of the vehicle, route information associated with the vehicle, a destination of the vehicle, and whether priority is to be given to the vehicle. The identifier may be determined (e.g., a predefined identifier, such as a license plate number, a call number, and/or the like) and/or assigned (e.g., if a particular identifier cannot be determined from the vehicle) when mapping the remaining vehicle information (representing travel characteristics of the vehicle in the roadway) to a particular vehicle. For example, the identifier may be any suitable addressable identification that permits data (e.g., vehicle information) associated with the vehicle to be mapped and/or assigned to the vehicle to permit the navigation platform to correlate the data associated to the vehicle when the vehicle is identified (e.g., within the images). The type of the vehicle may be determined from images of the vehicle and/or vehicle data (e.g., vehicle data identifying the type of the vehicle). The speed of the vehicle may be determined based on an analysis of images depicting the vehicle, measurements from the sensors, and/or from vehicle data associated with the vehicle (e.g., speed data received from the vehicle and/or a navigation application associated with the vehicle). The route information and/or destination information may be determined from vehicle data received from the vehicle and/or a user device associated with the vehicle. The priority may be based on the type of vehicle. For example, as indicated in the vehicle information of FIG. 1B, vehicle 68 may be an emergency vehicle (designated as "EV"), such as an ambulance or fire truck, and thus is to be given priority, while vehicle 54 may be a car that is not to receive priority. In some implementations, rather than priority being a binary value ("YES" or "NO"), the priority may be indicated according to a particular scale or range (e.g., '1' meaning low priority and '5' meaning high priority).

From the vehicle information of example implementation 100, the navigation platform may determine lane occupancies of the lanes. For example, using the lane information in the vehicle information, the navigation platform may determine the quantity of vehicles in each of lanes 1-5 in example implementation 100. More specifically, the navigation platform may calculate the number of vehicles associated with a same lane identifier to determine the quantity of vehicles in the lane associated with the lane identifier. Accordingly, the navigation platform may determine that lane 1 includes two vehicles (including vehicle 54), lane 2 includes 3 vehicles (including vehicle 89), lane 3 includes two vehicles, lane 4 includes one vehicle (vehicle 68), and lane 5 includes 2 vehicles.

In some implementations, the navigation platform may determine a lane occupancy of a lane based on the determined quantity of vehicles in the lane (e.g., as indicated in the vehicle information). For example, the navigation platform may determine the lane occupancy based on the quantity of vehicles, one or more lengths (or other types of sizes) associated with the vehicles in the lane, a length of the lane, an expected rate of travel of the vehicles (e.g., corresponding to a speed limit of the roadway), and/or the like. In some implementations, the one or more lengths may be determined based on analyzing the images of the vehicles as described herein. Additionally, or alternatively, the navigation platform may use one or more predetermined lengths for the vehicles (e.g., an average length of a vehicle (e.g., based on region, a training set of vehicles, and/or the like), one or more average lengths based on the types of vehicles, and/or the like). In this way, rather than spend computing resources on processing images to determine lengths or analyzing measurements to determine the sizes, the navigation platform may use predetermined lengths of the vehicles to determine the lane occupancies, which utilizes less resources than image processing.

Accordingly, based on summing and/or multiplying lengths of the vehicles (as determined by the sizes), the navigation platform may determine the lane occupancies of the lanes as percentages of the overall lengths of the lanes. In some implementations, the overall lengths may be preconfigured and/or predetermined (e.g., known to the navigation platform). Additionally, or alternatively, the overall lengths of the lanes may be calculated based on images of the roadway, images of the section, features of the sections (e.g., lanes on the inside of a curve in a section may be shorter than lanes on an outside of a curve of the section, a lane of a section with a portion under construction may be shorter than a lane of the section that is not under construction, and/or the like). In some implementations, the navigation platform may be preconfigured to store, in a memory, a maximum number of vehicles that can fit within a particular lane of a section of a roadway. In such cases, the lane occupancy may correspond to a percentage of the maximum number of vehicles that can fit in the section of the roadway. In this way, the navigation platform may determine lane occupancies of the lanes of Section 1 of example implementation 100, based on the quantity of vehicles in the lanes and the lengths of the lanes of Section 1 (which are shown as equal, but may be different in other examples).

In some implementations, the navigation platform may determine a total quantity of vehicles in a particular section of a roadway (and/or in particular lane of a roadway) to determine whether to enable multi-lane navigation, as described herein. For example, the navigation platform may determine, from the vehicle information, that the quantity of vehicles in Section 1 (or in a particular lane of Section 1) satisfies a threshold quantity (and/or corresponding lane occupancy value). In such cases, the navigation platform may trigger multi-lane navigation capabilities and/or identify target vehicles for multi-lane navigation. For example, as shown, based on determining that the vehicles in Section 1 are occupying a threshold capacity of Section 1, the navigation platform may monitor for and/or detect a target vehicle in order to provide navigation instructions to the target vehicle. In this way, when one or more sections of a roadway are relatively clear of traffic (e.g., not occupied by a threshold quantity of vehicles), the navigation platform may not consume resources associated with identifying a target vehicle for multi-lane navigation, determining a target lane for a vehicle, and/or providing multi-lane navigation instructions to the target vehicle, as described herein.

In this way, the navigation platform may generate, determine, and/or analyze vehicle information association with vehicles of a roadway to enable the navigation platform to identify (e.g., if necessary) a target lane for a target vehicle and/or enable multi-lane navigation for the target vehicle.

As shown in FIG. 1C, and by reference number 150, the navigation platform selects the target lane for the target vehicle based on individual lane occupancies of the roadway. For example, based on determining that the target vehicle is approaching traffic in Section 1 (e.g., by determining that the quantity of vehicles in Section 1 satisfies a threshold corresponding to the presence of traffic), the navigation platform may determine that a target lane is to be determined and/or selected for the target vehicle in order to enable the target vehicle to travel through the section in an optimal manner. The optimal manner, as described herein, may be based on balancing the lanes of the section, based on a destination or route of the target vehicle, based on a speed (e.g., a current speed, a desired speed, an optimal speed relative to other vehicles in the section, and/or the like) of travel of the target vehicle, and/or the like.

In some implementations, the navigation platform may use a machine learning model, such as a selection model, to select a target lane for a vehicle. For example, the navigation platform may train the selection model based on one or more lane selection parameters associated with the navigation platform selecting target lanes of a particular section (or other sections) for one or more other target vehicles, such as characteristics of the other target vehicles (e.g., speeds, routes, destinations, and/or the like), characteristics of the lanes of the section (e.g., lane occupancies), characteristics of vehicles in the lanes (e.g., average speeds of travel of the vehicles in the lanes, types of vehicles in the lanes, priorities of vehicles in the lanes, and/or the like), and/or the like. The navigation platform may train the selection model using historical data associated with selecting a target lane of a section (e.g., of Section 1) according to the one or more lane selection parameters. Using the historical data and the one or more lane selection parameters as inputs to the selection model, the navigation platform may enable target lane selection in order to permit the target vehicle to navigate to a selected target lane. According to some implementations, the selection model may be a predictive model that is trained to predict a condition of a section of the roadway (e.g., specific locations of the vehicles in Section 1) at a time when the target vehicle is expected to arrive at or reach the section (e.g., based on the speed of the target vehicle and the speeds of the vehicles in the section).

In some implementations, the navigation platform (e.g., via the selection model) can utilize a scoring system to determine a score associated with selecting a lane of travel for the target vehicle based on characteristics of the target vehicle, characteristics of the lane, characteristics of vehicles in the lane, and/or the like. Using such a scoring system, the navigation platform can apply weights (w) to parameters corresponding to the speed, route, destination, and/or the like of the target vehicle, the respective lane occupancies of the lanes of the section of the roadway, an average speed of travel of the vehicles in the lane, the types of vehicles in the lane, the priorities of the vehicles in the lane, and/or the like. Accordingly, the navigation platform can determine (e.g., via one or more calculations associated with the scoring system) scores for a set of lanes based on the scoring system that are representative of whether or not the lanes are to be selected for travel for a particular target vehicle. For example, the navigation platform can use the following to determine the score ($s_{ij}$) based on three characteristics a, b, c of a lane i for a target vehicle j:

$$s_{ij} = w_{aj}a_i + w_{bj}b_i + w_{cj}c_i + \ldots \quad (1)$$

where $w_{aj}$, $w_{bj}$, $w_{cj}$ correspond to adjusted weights based on the relevance to the target vehicle j for parameters $a_i$, $b_i$, $c_i$ that correspond to the characteristics of the lane i. For example, parameters $a_i$, $b_i$, $c_i$ may include a value (e.g., a characteristic-specific score) associated with a scale for the respective characteristics associated with parameters $a_i$, $b_i$, $c_i$. Additionally, or alternatively, the adjusted weights $w_{aj}$, $w_{bj}$, $w_{cj}$ may be normalized (e.g., where $0 \leq w_{aj}, w_{bj}, w_{cj} \leq 1$ and $w_{aj} + w_{bj} + w_{cj} = 1$).

Referring specifically to example implementation 100, the navigation platform may be more likely to select lane 4 as a target lane for the target vehicle, because lane 4 has the lowest lane occupancy (and/or lowest quantity of vehicles in the lane). In this way, the navigation platform may select a target lane to balance the quantities of vehicles in the lanes of Section 1. Additionally, or alternatively, due to the vehicle information for vehicle 68 (which is determined to be the only vehicle in lane 4) indicating that vehicle 68 is moving at a speed that is relatively greater than the speeds of the vehicles in lanes 1, 2, 3, and 5, the navigation platform may be more likely to select lane 4 as the target lane for the target vehicle. However, if, in another example, the speed of vehicle 68 was determined to be 0 and/or less than the speed of vehicle 54 in lane 1 (or the average of the speeds of the vehicles in lane 1), the navigation platform may be more likely to select lane 1 as the target lane rather than lane 4. In such a case, the navigation platform may select lane 1 as the target lane so that the target vehicle can traverse Section 1 more quickly than if the target vehicle navigated to lane 4.

In this way, the navigation platform may select a target lane for the target vehicle to permit the target vehicle to navigate to the determined target lane and/or traverse the roadway in an optimal manner (e.g., according to the selection model).

As further shown in FIG. 1C, and by reference number 160, the navigation platform provides target lane information to the target vehicle. The target lane information may identify the target lane and/or be included within navigation information (or navigation instructions) for a navigation system of the vehicle and/or a user device of the vehicle. As described herein, the navigation platform may include and/or may be associated with the navigation system (e.g., via an application, one or more communication links, and/or the like) of the vehicle.

Such a navigation system may include a user interface that can visually present (e.g., via a display of the user interface) or audibly provide (e.g., via a speaker of the user interface) navigation information or navigation instructions (e.g., turn-by-turn instructions, map-view navigation instructions, and/or the like) to a user. As described herein, the navigation system may be configured to display multi-lane information associated with the roadway. For example, specific information about lanes of a roadway may be displayed via a user interface of the vehicle and/or a user interface of a user device associated with the vehicle. Accordingly, the navigation information, provided by the navigation platform, may indicate individual lanes of travel that are available on a roadway and/or specify which of the available lanes is (or should be) the target lane for the vehicle to traverse a particular section of the roadway. In some implementations, the navigation system may include or be pre-installed with roadway information (e.g., map information, map images, and/or any information that identifies locations, areas, features, and/or the like of the roadway) with lane specific information. In such cases, the navigation instructions may be combined with the roadway information to facilitate navigation. Accordingly, based on selecting a target lane for the target vehicle, the navigation platform can provide navigation information to the target vehicle (and/or a user device associated with the target vehicle) to permit the target vehicle and/or an operator of the target vehicle to navigate (e.g., control and/or maneuver the vehicle) to the target lane (e.g., if the operator of the target vehicle chooses to follow the navigation instructions).

Additionally, or alternatively, the navigation platform and/or navigation system may be utilized by an autonomous vehicle to control the autonomous vehicle. For example, the navigation system may be used to provide control instructions to one or more systems or devices (e.g., drives, steering systems, braking systems, power systems, and/or the like) that facilitate mobility and/or maneuverability of the autonomous vehicle. In some implementations, the control instructions may be received as suggested navigation instructions that may be overridden by the autonomous vehicle. For example, if one or more onboard sensors of an autonomous vehicle (which may be considered to be more reliable than the navigation instructions according to a configuration of the autonomous vehicle) detect that a collision may occur if the navigation instructions are followed, the autonomous vehicle may disregard the navigation instructions provided by the navigation platform, as described herein. Accordingly, navigation information from the navigation platform may be utilized by the navigation system to cause (or attempt to cause) the autonomous vehicle to travel in a particular direction, travel at a particular speed, merge into a specific lane (e.g., the target lane), and/or the like.

Referring to example implementation 100 in FIG. 1C, if the selected target lane is lane 4, the navigation platform may provide navigation information to the target vehicle to cause the target vehicle to enter lane 4. For example, if the target vehicle is an operator controlled vehicle, the navigation platform may provide navigation instructions that are to be provided (e.g., presented via a display or audibly via a speaker) to the user via a user interface of the target vehicle.

Additionally, or alternatively, the navigation platform may cause one or more vehicles other than the target vehicle to navigate to a particular target lane. For example, based on vehicle 68 being an emergency vehicle with priority (as shown in FIG. 1B), the navigation platform may have selected and/or provided (e.g., prior to the example shown in FIG. 1C) navigation information to a vehicle shown in lane 3 to cause the vehicle to exit lane 4 and enter lane 3 (e.g., to make way for the emergency vehicle). In such a case, the navigation platform may have identified the target lane of the emergency vehicle as lane 4, and based on the emergency vehicle having a priority, identified lane 3 as a target lane for the vehicle in order to decrease the lane occupancy of lane 4 for the emergency vehicle, and provide navigation information (e.g., navigation instructions for display to an operator and/or control of the vehicle) identifying lane 3 as a target lane to cause the vehicle to exit lane 4 and enter lane 3.

In this way, the navigation platform may perform one or more actions to permit the target vehicle (and/or any other vehicle in a particular section of a roadway) to navigate to a target lane selected according to the example implementations described herein.

Therefore, as described herein, the navigation platform may permit vehicles to be navigated to particular lanes of travel of a multi-lane roadway, thereby maximizing roadway utilization (e.g., to enable the roadway to be efficiently used and/or to reach a maximum capacity of vehicles), reducing traffic congestion, improving fuel efficiency (e.g., gasoline and/or other fluids consumed by the vehicle) and/or power usage (e.g., electrical power) of the vehicles, and improving travel safety along the roadways (e.g., less accidents due to lane changes from relatively slow lanes to relatively fast lanes).

As indicated above, FIGS. 1A-1C are provided merely as one or more examples. Other examples may differ from what is described with regard to FIGS. 1A-1C.

Figure 2:
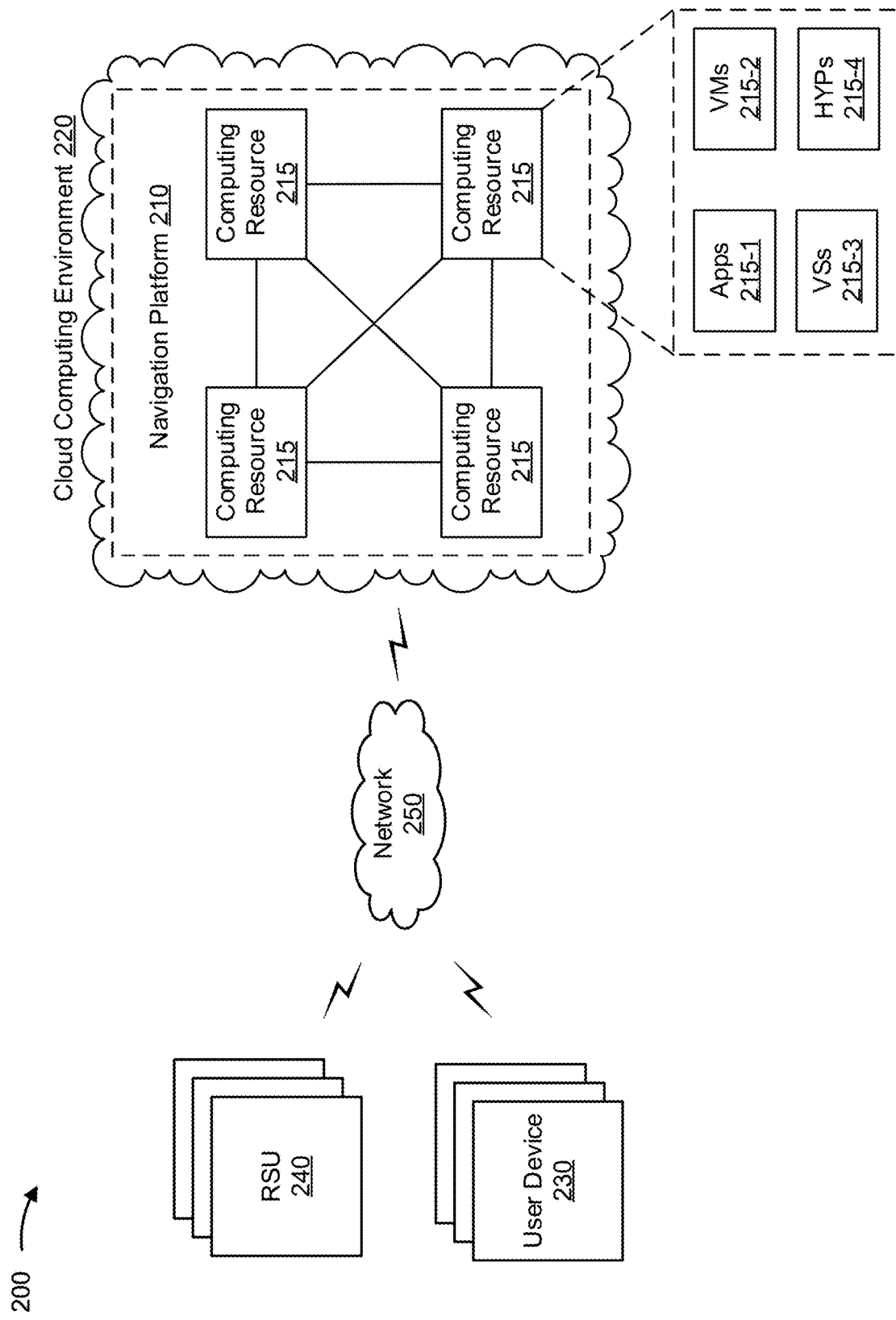
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a navigation platform hosted (e.g., via one or more computing resources 215) in a cloud computing environment 220, one or more user devices 230 (referred to individually as "user device 230" and collectively as "user devices 230"), RSU 240 (referred to individually as a "RSU 240" and collectively as "RSUs 240"), and a network 250. Devices of environment 200 may interconnect via wired connections, wireless connections, or a combination of wired and wireless connections.

Navigation platform 210 includes one or more computing resources assigned to facilitate multi-lane navigation as described herein. For example, navigation platform 210 may be a platform implemented by cloud computing environment 220 that may receive traffic data from RSU 240, determine vehicle information of vehicles on a roadway (e.g., vehicles associated with user devices 230), and provide navigation instructions to one or more of user devices 230 based on the vehicle information. In some implementations, navigation platform 210 is implemented by computing resources 215 of cloud computing environment 220.

Navigation platform 210 may include a server device or a group of server devices. In some implementations, navigation platform 210 may be hosted in cloud computing environment 220. Notably, while implementations described herein may describe navigation platform 210 as being hosted in cloud computing environment 220, in some implementations, navigation platform 210 may be non-cloud-based or may be partially cloud-based.

Cloud computing environment 220 includes an environment that delivers computing as a service, whereby shared resources, services, and/or the like may be provided to user device 230. Cloud computing environment 220 may provide computation, software, data access, storage, and/or other services that do not require end-user knowledge of a physical location and configuration of a system and/or a device that delivers the services. As shown, cloud computing environment 220 may include one or more computing resources 215.

Computing resource 215 includes one or more personal computers, workstation computers, server devices, or another type of computation and/or communication device. In some implementations, computing resource 215 may host navigation platform 210. The cloud resources may include compute instances executing in computing resource 215, storage devices provided in computing resource 215, data transfer devices provided by computing resource 215, and/or the like. In some implementations, computing resource 215 may communicate with other computing resources 215 via wired connections, wireless connections, or a combination of wired and wireless connections.

As further shown in FIG. 2, computing resource 215 may include a group of cloud resources, such as one or more applications ("APPs") 215-1, one or more virtual machines ("VMs") 215-2, virtualized storage ("VSs") 215-3, one or more hypervisors ("HYPs") 215-4, or the like.

Application 215-1 includes one or more software applications that may be provided to or accessed by user device 230. Application 215-1 may eliminate a need to install and execute the software applications on user device 230. For example, application 215-1 may include software associated with navigation platform 210 and/or any other software capable of being provided via cloud computing environment 220. In some implementations, one application 215-1 may send/receive information to/from one or more other applications 215-1, via virtual machine 215-2.

Virtual machine 215-2 includes a software implementation of a machine (e.g., a computer) that executes programs like a physical machine. Virtual machine 215-2 may be either a system virtual machine or a process virtual machine, depending upon use and degree of correspondence to any real machine by virtual machine 215-2. A system virtual machine may provide a complete system platform that supports execution of a complete operating system. A process virtual machine may execute a single program and may support a single process. In some implementations, virtual machine 215-2 may execute on behalf of a user (e.g., user device 230), and may manage infrastructure of cloud computing environment 220, such as data management, synchronization, or long-duration data transfers.

Virtualized storage 215-3 includes one or more storage systems and/or one or more devices that use virtualization techniques within the storage systems or devices of computing resource 215. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 215-4 provides hardware virtualization techniques that allow multiple operating systems (e.g., "guest operating systems") to execute concurrently on a host computer, such as computing resource 215. Hypervisor 215-4 may present a virtual operating platform to the guest operating systems and may manage the execution of the guest operating systems. Multiple instances of a variety of operating systems may share virtualized hardware resources.

User device 230 includes one or more devices capable of receiving, generating, storing, processing, and/or providing information associated with navigating a vehicle, as described herein. For example, user device 230 may include a communication and/or computing device, such as a mobile phone (e.g., a smart phone, a radiotelephone, and/or the like), a laptop computer, a tablet computer, a handheld computer, a wearable communication device (e.g., a smart wristwatch, a pair of smart eyeglasses, and/or the like), a console of a vehicle, an autonomous vehicle, a semi-autonomous vehicle, or a similar type of device.

RSU 240 includes one or more devices capable of receiving, collecting, storing, processing, and/or routing information associated with traffic data of a section of a roadway, as described herein. For example, RSU 240 may include and/or be communicatively coupled with one or more traffic data collection devices (e.g., one or more cameras, one or more sensors, and/or the like) that provide the traffic data to RSU 240. In some implementations, RSU 240 may include a communication interface that allows RSU 240 to receive information from and/or transmit information to other devices in environment 200.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
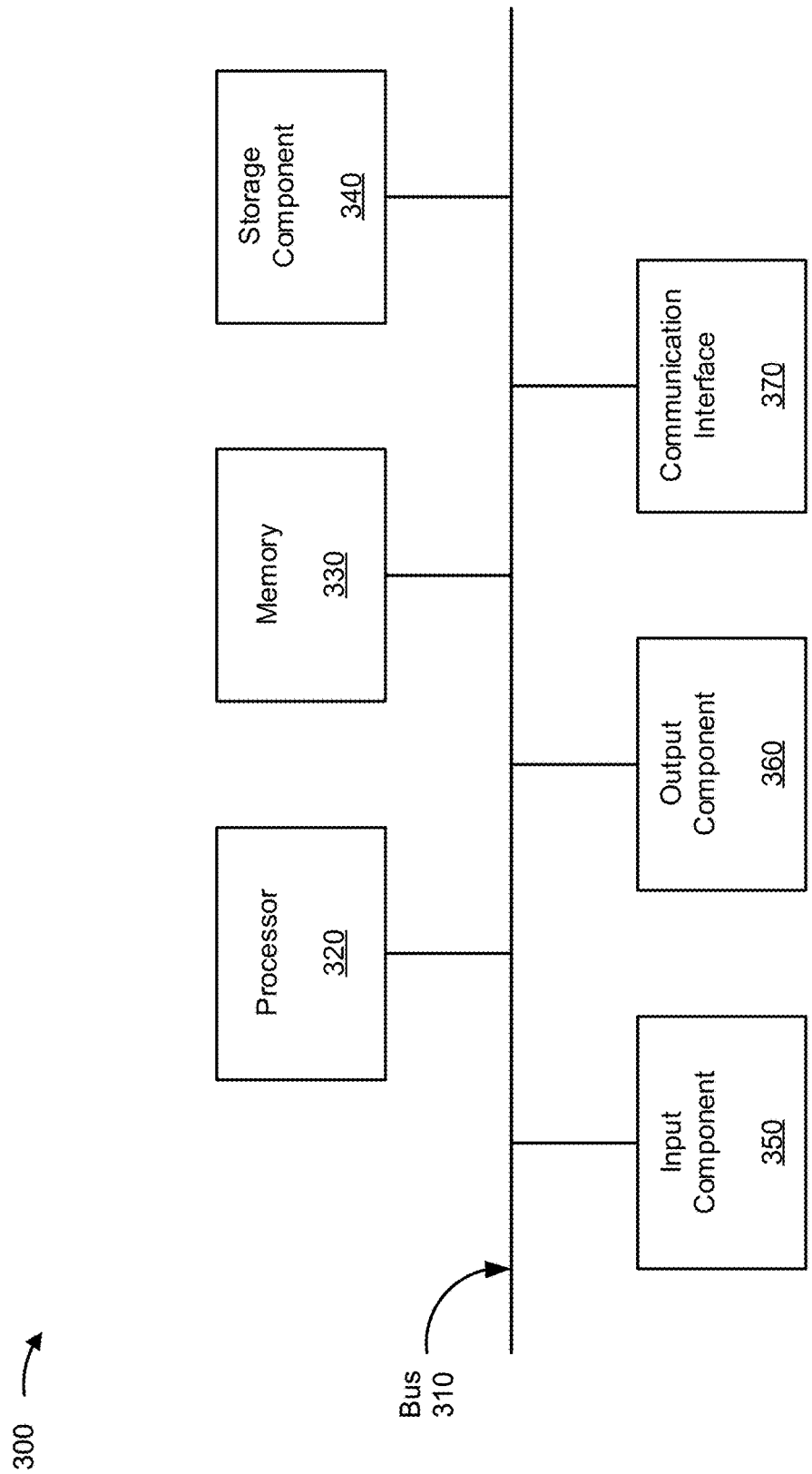
FIG. 3 is a diagram of example components of one or more devices of FIG. 2.

FIG. 3 is a diagram of example components of a device 300. Device 300 may correspond to navigation platform 210, computing resource 215, user device 230, and/or RSU 240. In some implementations, navigation platform 210, computing resource 215, user device 230, and/or RSU 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a WI-FI® interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
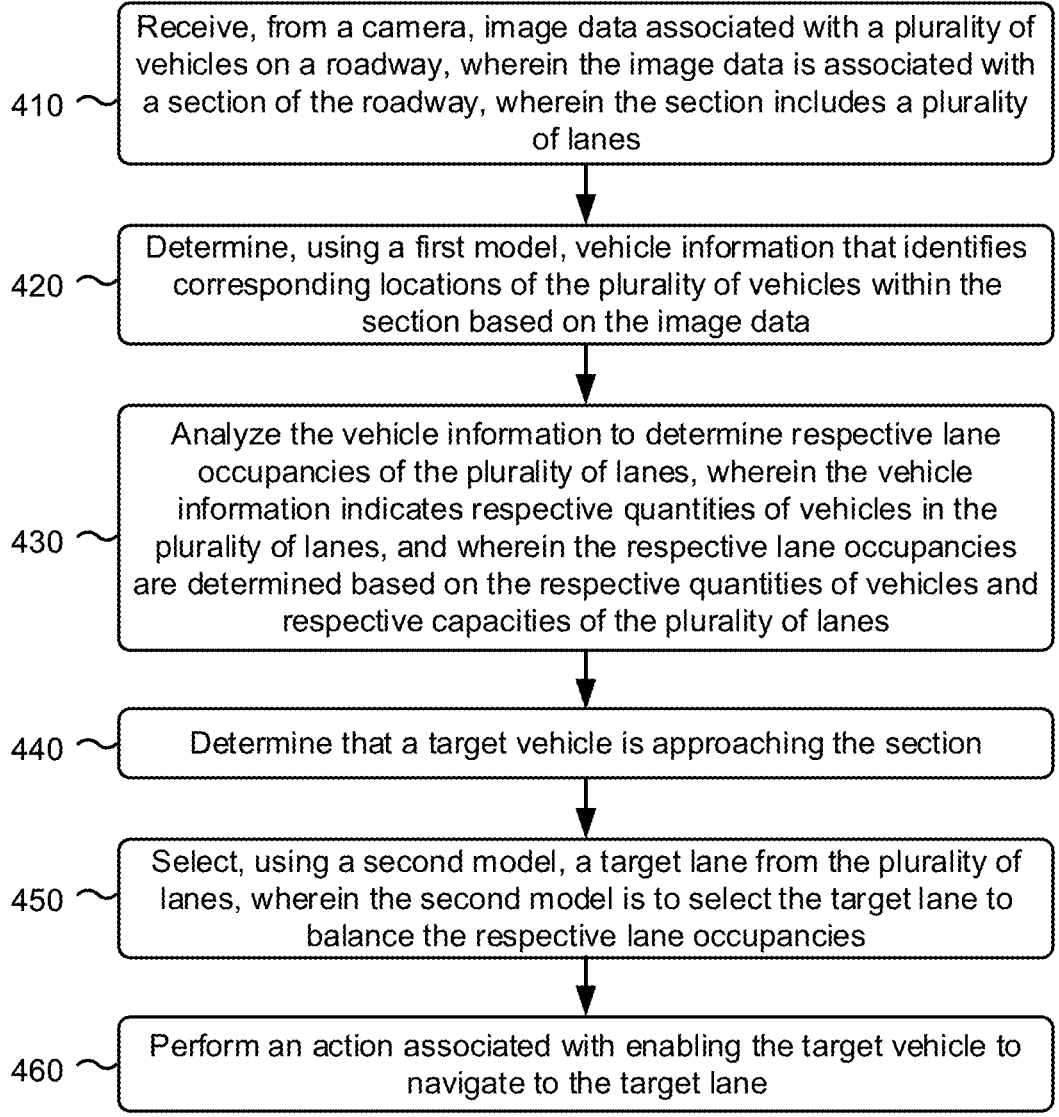
FIGS. 4-6 are flowcharts of example processes associated with a navigation analysis for a multi-lane roadway.

FIG. 4 is a flow chart of an example process 400 associated with a navigation analysis for a multi-lane roadway. In some implementations, one or more process blocks of FIG. 4 may be performed by a navigation platform (e.g., navigation platform 210). In some implementations, one or more process blocks of FIG. 4 may be performed by another device or a group of devices separate from or including the navigation platform, such as a user device (e.g., user device 230), an RSU (e.g., RSU 240), and/or the like.

As shown in FIG. 4, process 400 may include receiving, from a camera, image data associated with a plurality of vehicles on a roadway, wherein the image data is associated with a section of the roadway and wherein the section includes a plurality of lanes (block 410). For example, the navigation platform (e.g., using processor 320, memory 330, storage component 340, input component 350, output component 360, communication interface 370 and/or the like) may receive, from a camera, image data associated with a plurality of vehicles on a roadway, as described above. In some implementations, the image data is associated with a section of the roadway. In some implementations, the section includes a plurality of lanes.

As further shown in FIG. 4, process 400 may include determining, using a first model, vehicle information that identifies corresponding locations of the plurality of vehicles within the section based on the image data (block 420). For example, the navigation platform (e.g., using processor 320, memory 330, storage component 340, input component 350, output component 360, communication interface 370 and/or the like) may determine, using a first model, vehicle information that identifies corresponding locations of the plurality of vehicles within the section based on the image data, as described above.

As further shown in FIG. 4, process 400 may include analyzing the vehicle information to determine respective lane occupancies of the plurality of lanes, wherein the vehicle information indicates respective quantities of vehicles in the plurality of lanes and wherein the respective lane occupancies are determined based on the respective quantities of vehicles and respective capacities of the plurality of lanes (block 430). For example, the navigation platform (e.g., using processor 320, memory 330, storage component 340, input component 350, output component 360, communication interface 370 and/or the like) may analyze the vehicle information to determine respective lane occupancies of the plurality of lanes, as described above. In some implementations, the vehicle information indicates respective quantities of vehicles in the plurality of lanes. In some implementations, the respective lane occupancies are determined based on the respective quantities of vehicles and respective capacities of the plurality of lanes.

As further shown in FIG. 4, process 400 may include determining that a target vehicle is approaching the section (block 440). For example, the navigation platform (e.g., using processor 320, memory 330, storage component 340, input component 350, output component 360, communication interface 370 and/or the like) may determine that a target vehicle is approaching the section, as described above.

As further shown in FIG. 4, process 400 may include selecting, using a second model, a target lane from the plurality of lanes, wherein the second model is to select the target lane to balance the respective lane occupancies (block 450). For example, the navigation platform (e.g., using processor 320, memory 330, storage component 340, input component 350, output component 360, communication interface 370 and/or the like) may select, using a second model, a target lane from the plurality of lanes, as described above. In some implementations, the second model is to select the target lane to balance the respective lane occupancies.

As further shown in FIG. 4, process 400 may include performing an action associated with enabling the target vehicle to navigate to the target lane (block 460). For example, the navigation platform (e.g., using processor 320, memory 330, storage component 340, input component 350, output component 360, communication interface 370 and/or the like) may perform an action associated with enabling the target vehicle to navigate to the target lane, as described above.

Process 400 may include additional implementations, such as any single implementation or any combination of implementations described below and/or in connection with one or more other processes described elsewhere herein.

In a first implementation, the respective capacities of the plurality of lanes are determined based on a total length of the section and a predetermined vehicle length. In a second implementation, alone or in combination with the first implementation, the image data corresponds to one or more images of the section of the roadway. In some implementations, the first model is associated with an image processing model trained to detect vehicles in the plurality of lanes to determine the vehicle information.

In a third implementation, alone or in combination with one or more of the first and second implementations, the image data corresponds to one or more images of the section of the roadway, the first model is associated with an image processing model, and the image processing model is to: analyze the image data to identify the plurality of vehicles and the plurality of lanes depicted in the images; determine, from respective locations of the plurality of vehicles relative to the plurality of lanes depicted in the images, the respective quantities of vehicles in the plurality of lanes; and generate the vehicle information to include information identifying the respective quantities of vehicles in the plurality of lanes.

In a fourth implementation, alone or in combination with one or more of the first through third implementations, the image data is first image data and the section is a first section of the roadway. In some implementations, the target vehicle is determined to be approaching the first section based on second image data associated with a second section of the roadway.

In a fifth implementation, alone or in combination with one or more of the first through fourth implementations, the navigation platform is to determine that a quantity of the plurality of vehicles satisfies a threshold quantity, and the target lane is selected from the plurality of lanes based on determining that the quantity of the plurality of vehicles satisfies the threshold quantity.

In a sixth implementation, alone or in combination with one or more of the first through fifth implementations, the navigation platform, when performing the action, is to at least one of cause the target vehicle to enter the target lane or cause navigation instructions identifying the target lane to be displayed via a user interface associated with the target vehicle.

In a seventh implementation, alone or in combination with one or more of the first through sixth implementations, the camera is associated with a roadside unit and positioned to capture images of the section of the roadway, the roadside unit is to collect traffic data associated with the section of the roadway, and the traffic data includes the image data and at least one of sensor data from one or more sensors associated with the roadside unit, vehicle data received from one or more of the plurality of vehicles, or user device data received from one or more user devices associated with one or more of the plurality of vehicles, and the first model determines the vehicle information based on the traffic data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
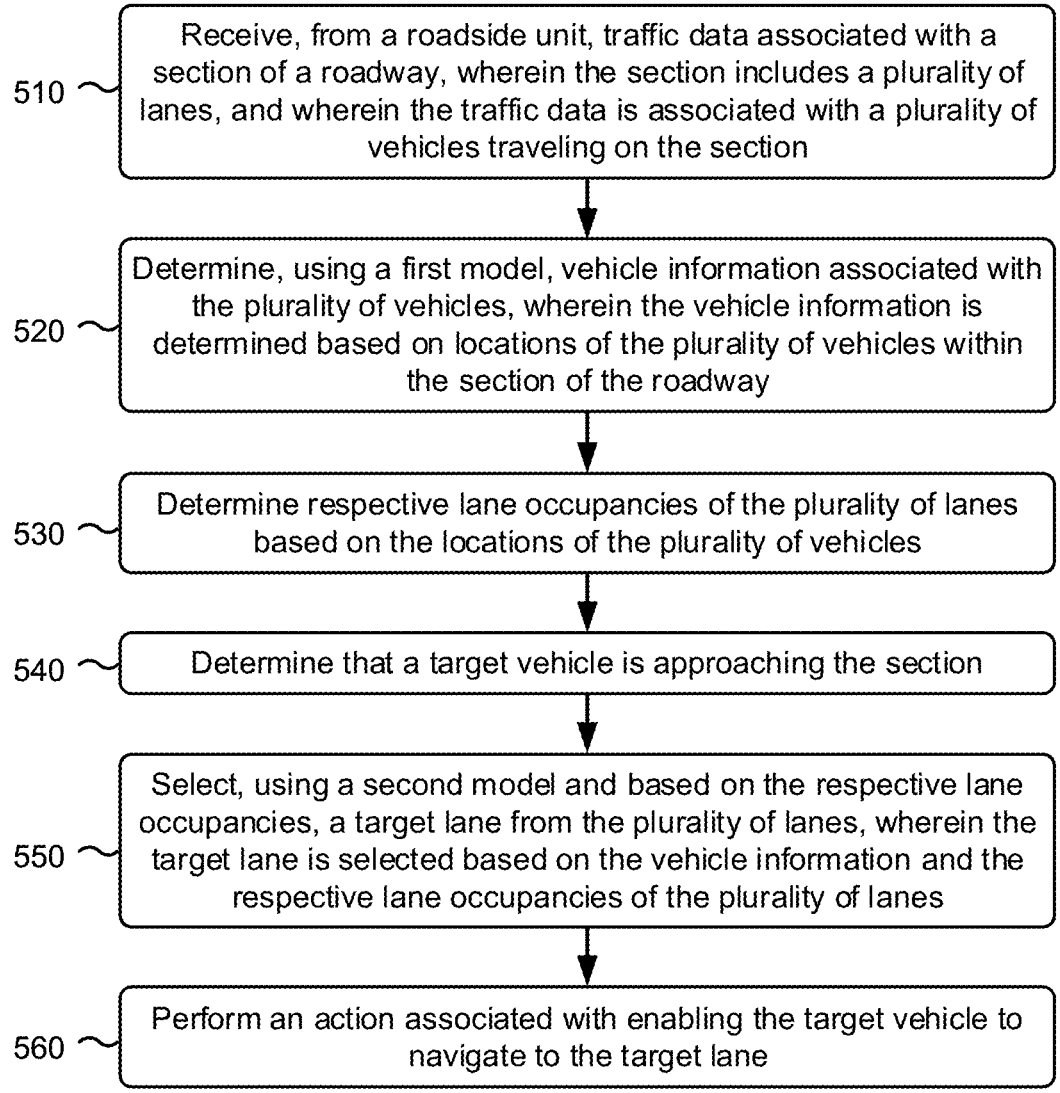

FIG. 5 is a flow chart of an example process 500 associated with a navigation analysis for a multi-lane roadway. In some implementations, one or more process blocks of FIG. 5 may be performed by a navigation platform (e.g., navigation platform 210). In some implementations, one or more process blocks of FIG. 5 may be performed by another device or a group of devices separate from or including the navigation platform, such as a user device (e.g., user device 230), an RSU (e.g., RSU 240), and/or the like.

As shown in FIG. 5, process 500 may include receiving, from a roadside unit, traffic data associated with a section of a roadway, wherein the section includes a plurality of lanes and wherein the traffic data is associated with a plurality of vehicles traveling on the section (block 510). For example, the navigation platform (e.g., using processor 320, memory 330, storage component 340, input component 350, output component 360, communication interface 370 and/or the like) may receive, from a roadside unit, traffic data associated with a section of a roadway, as described above. In some implementations, the section includes a plurality of lanes. In some implementations, the traffic data is associated with a plurality of vehicles traveling on the section.

As further shown in FIG. 5, process 500 may include determining, using a first model, vehicle information associated with the plurality of vehicles, wherein the vehicle information is determined based on locations of the plurality of vehicles within the section of the roadway (block 520). For example, the navigation platform (e.g., using processor 320, memory 330, storage component 340, input component 350, output component 360, communication interface 370 and/or the like) may determine, using a first model, vehicle information associated with the plurality of vehicles, as described above. In some implementations, the vehicle information is determined based on locations of the plurality of vehicles within the section of the roadway.

As further shown in FIG. 5, process 500 may include determining respective lane occupancies of the plurality of lanes based on the locations of the plurality of vehicles (block 530). For example, the navigation platform (e.g., using processor 320, memory 330, storage component 340, input component 350, output component 360, communication interface 370 and/or the like) may determine respective lane occupancies of the plurality of lanes based on the locations of the plurality of vehicles, as described above.

As further shown in FIG. 5, process 500 may include determining that a target vehicle is approaching the section (block 540). For example, the navigation platform (e.g., using processor 320, memory 330, storage component 340, input component 350, output component 360, communication interface 370 and/or the like) may determine that a target vehicle is approaching the section, as described above.

As further shown in FIG. 5, process 500 may include selecting, using a second model and based on the respective lane occupancies, a target lane from the plurality of lanes, wherein the target lane is selected based on the vehicle information and the respective lane occupancies of the plurality of lanes (block 550). For example, the navigation platform (e.g., using processor 320, memory 330, storage component 340, input component 350, output component 360, communication interface 370 and/or the like) may select, using a second model and based on the respective lane occupancies, a target lane from the plurality of lanes, as described above. In some implementations, the target lane is selected based on the vehicle information and the respective lane occupancies of the plurality of lanes.

As further shown in FIG. 5, process 500 may include performing an action associated with enabling the target vehicle to navigate to the target lane (block 560). For example, the navigation platform (e.g., using processor 320, memory 330, storage component 340, input component 350, output component 360, communication interface 370 and/or the like) may perform an action associated with enabling the target vehicle to navigate to the target lane, as described above.

Process 500 may include additional implementations, such as any single implementation or any combination of implementations described below and/or in connection with one or more other processes described elsewhere herein.

In a first implementation, the vehicle information includes, for each vehicle of the plurality of vehicles, one or more of a vehicle identifier of the vehicle, a lane identifier indicating which lane is occupied by the vehicle, a travel speed of the vehicle, a route associated with the vehicle, a destination of the vehicle, a type of the vehicle, or a priority associated with the vehicle.

In a second implementation, alone or in combination with the first implementation, the traffic data includes sensor data corresponding to sensor measurements from sensors of the section, and the first model is to: analyze the sensor data to identify respective quantities of vehicles in the plurality of lanes and determine the respective lane occupancies based on the respective quantities of vehicles and respective capacities of the plurality of lanes.

In a third implementation, alone or in combination with one or more of the first and second implementations, the navigation platform, when performing the action, is to at least one of: cause the target vehicle to enter the target lane, wherein the target vehicle is an autonomous vehicle, cause navigation instructions identifying the target lane to be displayed via a user interface associated with the target vehicle, cause a vehicle of the plurality of vehicles to exit the target lane to permit the target vehicle to travel in the target lane, wherein the vehicle of the plurality of vehicles is an autonomous vehicle, or cause navigation instructions to be provided via a user interface of a vehicle of the plurality of vehicles, wherein the navigation instructions indicate that the vehicle is to exit the target lane to permit the target vehicle to travel in the target lane.

In a fourth implementation, alone or in combination with one or more of the first through third implementations, the second model is to select the target lane in order to balance the respective lane occupancies of the plurality of lanes of the section. In a fifth implementation, alone or in combination with one or more of the first through fourth implementations, the roadside unit includes at least one of: a camera configured to capture images of the section, or a sensor configured to determine location information of a vehicle in a particular lane of the section.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
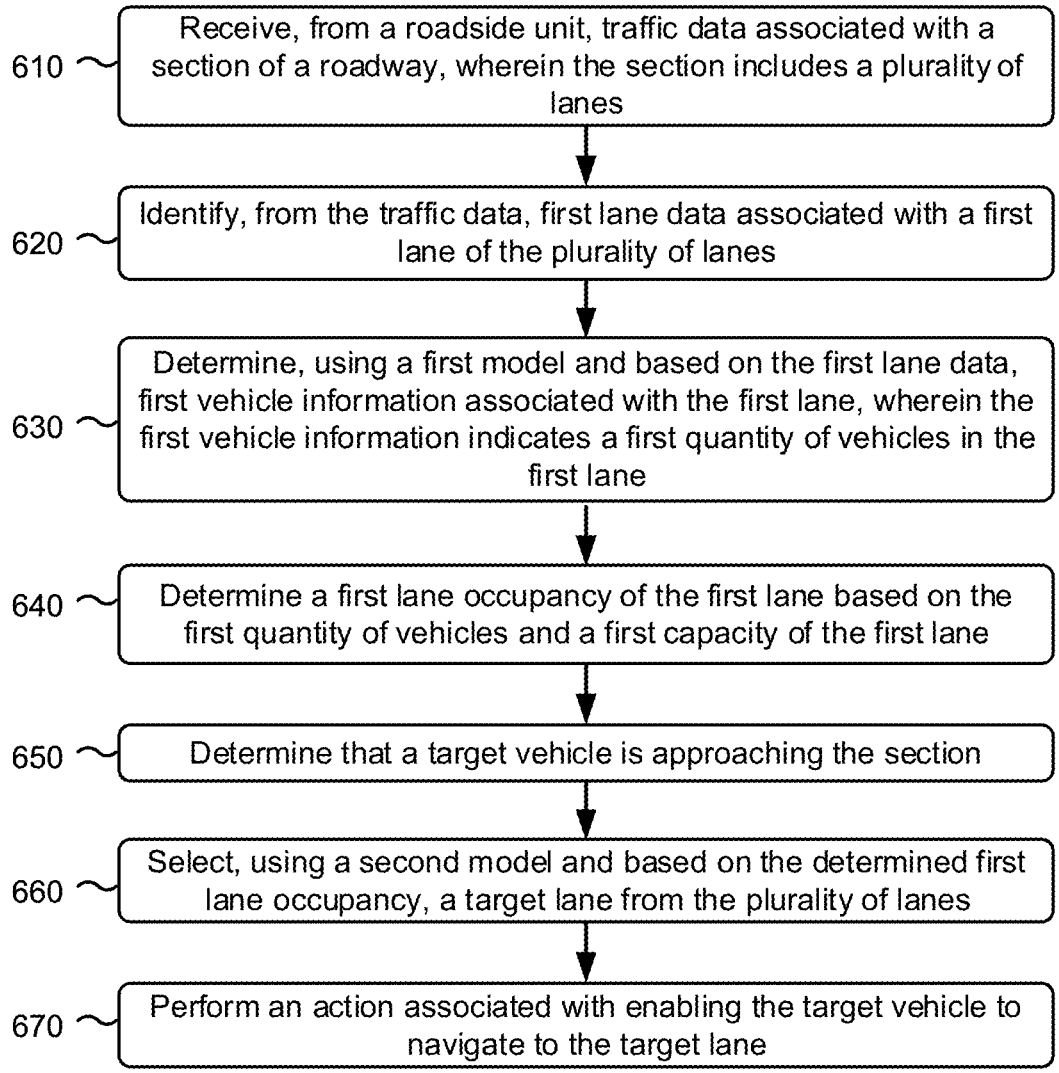

FIG. 6 is a flow chart of an example process 600 associated with a navigation analysis for a multi-lane roadway. In some implementations, one or more process blocks of FIG. 6 may be performed by a navigation platform (e.g., navigation platform 210). In some implementations, one or more process blocks of FIG. 6 may be performed by another device or a group of devices separate from or including the navigation platform, such as a user device (e.g., user device 230), an RSU (e.g., RSU 240), and/or the like.

As shown in FIG. 6, process 600 may include receiving, from a roadside unit, traffic data associated with a section of a roadway, wherein the section includes a plurality of lanes (block 610). For example, the navigation platform (e.g., using processor 320, memory 330, storage component 340, input component 350, output component 360, communication interface 370 and/or the like) may receive, from a roadside unit, traffic data associated with a section of a roadway, as described above. In some implementations, the section includes a plurality of lanes.

As further shown in FIG. 6, process 600 may include identifying, from the traffic data, first lane data associated with a first lane of the plurality of lanes (block 620). For example, the navigation platform (e.g., using processor 320, memory 330, storage component 340, input component 350, output component 360, communication interface 370 and/or the like) may identify, from the traffic data, first lane data associated with a first lane of the plurality of lanes, as described above.

As further shown in FIG. 6, process 600 may include determining, using a first model and based on the first lane data, first vehicle information associated with the first lane, wherein the first vehicle information indicates a first quantity of vehicles in the first lane (block 630). For example, the navigation platform (e.g., using processor 320, memory 330, storage component 340, input component 350, output component 360, communication interface 370 and/or the like) may determine, using a first model and based on the first lane data, first vehicle information associated with the first lane, as described above. In some implementations, the first vehicle information indicates a first quantity of vehicles in the first lane.

As further shown in FIG. 6, process 600 may include determining a first lane occupancy of the first lane based on the first quantity of vehicles and a first capacity of the first lane (block 640). For example, the navigation platform (e.g., using processor 320, memory 330, storage component 340, input component 350, output component 360, communication interface 370 and/or the like) may determine a first lane occupancy of the first lane based on the first quantity of vehicles and a first capacity of the first lane, as described above.

As further shown in FIG. 6, process 600 may include determining that a target vehicle is approaching the section (block 650). For example, the navigation platform (e.g., using processor 320, memory 330, storage component 340, input component 350, output component 360, communication interface 370 and/or the like) may determine that a target vehicle is approaching the section, as described above.

As further shown in FIG. 6, process 600 may include selecting, using a second model and based on the determined first lane occupancy, a target lane from the plurality of lanes (block 660). For example, the navigation platform (e.g., using processor 320, memory 330, storage component 340, input component 350, output component 360, communication interface 370 and/or the like) may select, using a second model and based on the determined first lane occupancy, a target lane from the plurality of lanes, as described above.

As further shown in FIG. 6, process 600 may include performing an action associated with enabling the target vehicle to navigate to the target lane (block 670). For example, the navigation platform (e.g., using processor 320, memory 330, storage component 340, input component 350, output component 360, communication interface 370 and/or the like) may perform an action associated with enabling the target vehicle to navigate to the target lane, as described above.

Process 600 may include additional implementations, such as any single implementation or any combination of implementations described below and/or in connection with one or more other processes described elsewhere herein.

In a first implementation, the navigation platform is to identify, from the traffic data, second lane data associated with a second lane of the plurality of lanes, determine, using the first model and based on the second lane data, second vehicle information associated with the second lane and the second vehicle information indicates a second quantity of vehicles in the second lane, determine a second lane occupancy of the second lane based on the second quantity of vehicles and a second capacity of the second lane, and the target lane is selected based on the first lane occupancy and the second lane occupancy.

In a second implementation, alone or in combination with the first implementation, the second model is to select the target lane from the first lane and the second lane, and the second model is to select the target lane as the first lane when the first lane occupancy is less than the second lane occupancy, or the second model is to select the target lane as the second lane when the second lane occupancy is less than the first lane occupancy.

In a third implementation, alone or in combination with one or more of the first and second implementations, the navigation platform is to determine that at least one of the first quantity of vehicles or the second quantity of vehicles satisfy a threshold quantity, and the target lane is selected from the plurality of lanes based on determining that at least one of the first quantity of vehicles or the second quantity of vehicles satisfies the threshold quantity.

In a fourth implementation, alone or in combination with one or more of the first through third implementations, the traffic data includes image data corresponding to images of the section, and the first model comprises an image processing model to: analyze the image data to identify the first lane data, determine the first quantity of vehicles based on the first portions of the images depicting vehicles in the first lane, generate the first vehicle information by mapping the first quantity of vehicles to an identifier of the first lane.

In a fifth implementation, alone or in combination with one or more of the first through fourth implementations, the navigation platform is to at least one of cause the target vehicle to enter the target lane and the target vehicle is an autonomous vehicle, cause navigation instructions identifying the target lane to be displayed via a user interface associated with the target vehicle, cause a vehicle to exit the target lane to permit the target vehicle to travel in the target lane and the vehicle is an autonomous vehicle, or cause navigation instructions to be displayed via a user interface of a vehicle in the target lane and the navigation instructions indicate that the vehicle is to exit the target lane to permit the target vehicle to travel in the target lane.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Collection, storage, and use of personal information may be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device and from a camera, image data associated with a plurality of vehicles on a roadway,
wherein the image data is associated with a section of the roadway,
wherein the section includes a plurality of lanes;
determining, by the device, vehicle information that identifies corresponding locations of the plurality of vehicles within the section based on the image data;
analyzing, by the device, the vehicle information to determine respective lane occupancies of the plurality of lanes,
wherein the vehicle information indicates respective quantities of vehicles in the plurality of lanes, and
wherein the respective lane occupancies are determined based on the respective quantities of vehicles and respective capacities of the plurality of lanes;
monitoring, by the device, for a target vehicle approaching the section,
wherein monitoring for the target vehicle approaching the section is triggered by the plurality of vehicles occupying a threshold capacity of the section, and
wherein the target vehicle is to receive navigation instructions identifying a target lane, from the plurality of lanes;
training, by the device and using historical data, a selection model to select the target lane to balance the respective lane occupancies based on an application of weights to parameters associated with at least one of the target vehicle or the roadway;
selecting, by the device and using the selection model, the target lane; and
performing, by the device, an action associated with enabling the target vehicle to navigate to the target lane based on the navigation instructions.

2. The method of claim 1, wherein the respective capacities of the plurality of lanes are determined based on a total length of the section and a predetermined vehicle length.

3. The method of claim 1, wherein the image data corresponds to one or more images of the section of the roadway, and
wherein determining the vehicle information includes using an image processing model,
wherein the image processing model is trained to detect the plurality of vehicles in the plurality of lanes to determine the vehicle information.

4. The method of claim 1, wherein the image data corresponds to one or more images of the section of the roadway, and
wherein determining the vehicle information includes using an image processing model,
wherein the image processing model is to:
analyze the image data to identify the plurality of vehicles and the plurality of lanes depicted in the images;
determine, from respective locations of the plurality of vehicles relative to the plurality of lanes depicted in the images, the respective quantities of vehicles in the plurality of lanes; and
generate the vehicle information to include information identifying the respective quantities of vehicles in the plurality of lanes.

5. The method of claim 1, wherein the image data is first image data and the section is a first section of the roadway, and
wherein the target vehicle is determined to be approaching the first section based on second image data associated with a second section of the roadway.

6. The method of claim 1, wherein performing the action comprises at least one of:

causing the target vehicle to enter the target lane based on the navigation instructions,
   wherein the target vehicle is an autonomous vehicle; or
causing the navigation instructions to be displayed via a user interface associated with the target vehicle.

7. The method of claim 1, wherein the camera is associated with a roadside unit and positioned to capture images of the section of the roadway,
   wherein the roadside unit is to collect traffic data associated with the section of the roadway,
      wherein the traffic data includes the image data and at least one of:
         sensor data from one or more sensors associated with the roadside unit,
         vehicle data received from one or more of the plurality of vehicles, or
         user device data received from one or more user devices associated with the one or more of the plurality of vehicles, and
      wherein determining the vehicle information includes using an image processing model to determine the vehicle information based on the traffic data.

8. The method of claim 1, wherein the respective lane occupancies are determined further based on respective lengths of the plurality of vehicles and respective speeds of the plurality of vehicles.

9. A device, comprising:
one or more memories; and
one or more processors communicatively coupled to the one or more memories, to:
   receive, from a roadside unit, traffic data associated with a section of a roadway,
      wherein the section includes a plurality of lanes, and
      wherein the traffic data is associated with a plurality of vehicles traveling on the section;
   determine vehicle information associated with the plurality of vehicles,
      wherein the vehicle information is determined based on locations of the plurality of vehicles within the section of the roadway;
   determine respective lane occupancies of the plurality of lanes based on the locations of the plurality of vehicles;
   monitor for a target vehicle approaching the section,
      wherein the plurality of vehicles occupying a threshold capacity of the section triggers the one or more processors to monitor for the target vehicle approaching the section, and
      wherein the target vehicle is to receive navigation instructions identifying a target lane, from the plurality of lanes;
   train, using historical data, a selection model to select the target lane;
   select, using the selection model and based on an application of weights to parameters corresponding to the vehicle information and the respective lane occupancies, the target lane; and
   perform an action associated with enabling the target vehicle to navigate to the target lane based on the navigation instructions.

10. The device of claim 9, wherein the vehicle information includes, for each vehicle of the plurality of vehicles, one or more of:
a vehicle identifier of the vehicle,
a lane identifier indicating which lane is occupied by the vehicle,
a travel speed of the vehicle,
a route associated with the vehicle,
a destination of the vehicle,
a type of the vehicle, or
a priority associated with the vehicle.

11. The device of claim 9, wherein the traffic data includes sensor data corresponding to sensor measurements from sensors of the section, and
   wherein, the one or more processors, when determining the vehicle information, are to determine the vehicle information using an image processing model,
      wherein the image processing model is to:
         analyze the sensor data to identify respective quantities of vehicles in the plurality of lanes; and
         determine the respective lane occupancies based on the respective quantities of vehicles and respective capacities of the plurality of lanes.

12. The device of claim 9, wherein the one or more processors, when performing the action, are to at least one of:
   cause the target vehicle to enter the target lane based on the navigation instructions,
      wherein the target vehicle is an autonomous vehicle;
   cause the navigation instructions to be displayed via a user interface associated with the target vehicle;
   cause a first vehicle, of the plurality of vehicles, to exit the target lane to permit the target vehicle to travel in the target lane based on the navigation instructions,
      wherein the first vehicle is an autonomous vehicle; or
   cause other navigation instructions to be provided via a user interface of a second vehicle, of the plurality of vehicles,
      wherein the other navigation instructions indicate that the second vehicle is to exit the target lane to permit the target vehicle to travel in the target lane based on the navigation instructions.

13. The device of claim 9, wherein the selection model is to select the target lane to balance the respective lane occupancies of the plurality of lanes of the section.

14. The device of claim 9, wherein the roadside unit includes at least one of:
   a camera configured to capture images of the section,
      wherein image data associated with the images is included in the traffic data, or
   a sensor configured to determine location information of a vehicle in a particular lane of the section,
      wherein the location information is included in the traffic data.

15. A non-transitory computer-readable medium storing instructions, the instructions comprising:
   one or more instructions that, when executed by one or more processors, cause the one or more processors to:
      receive, from a roadside unit, traffic data associated with a section of a roadway,
         wherein the section includes a plurality of lanes, and
         wherein the traffic data is associated with a plurality of vehicles traveling on the section;
      identify, from the traffic data, first lane data associated with a first lane of the plurality of lanes;
      determine, based on the first lane data, first vehicle information associated with the first lane,
         wherein the first vehicle information indicates a first quantity of vehicles in the first lane;
      determine a first lane occupancy of the first lane based on the first quantity of vehicles and a first capacity of the first lane;
      monitor for a target vehicle approaching the section, wherein the plurality of vehicles occupying a threshold capacity of the section triggers the one or more processors to monitor for the target vehicle approaching the section, and
wherein the target vehicle is to receive navigation instructions identifying a target lane, from the plurality of lanes;
train, using historical data, a selection model to select the target lane based on an application of weights to parameters associated with at least one of the target vehicle or the roadway;
select, using the selection model and based on the first lane occupancy, the target lane; and
perform an action associated with enabling the target vehicle to navigate to the target lane based on the navigation instructions.

16. The non-transitory computer-readable medium of claim 15, wherein the one or more instructions, when executed by the one or more processors, further cause the one or more processors to:
identify, from the traffic data, second lane data associated with a second lane of the plurality of lanes;
determine, based on the second lane data, second vehicle information associated with the second lane,
wherein the second vehicle information indicates a second quantity of vehicles in the second lane; and
determine a second lane occupancy of the second lane based on the second quantity of vehicles and a second capacity of the second lane,
wherein the target lane is selected based on the first lane occupancy and the second lane occupancy.

17. The non-transitory computer-readable medium of claim 16, wherein the selection model is to select the target lane from the first lane and the second lane,
wherein the selection model is to select the target lane as the first lane when the first lane occupancy is less than the second lane occupancy, or
wherein the selection model is to select the target lane as the second lane when the second lane occupancy is less than the first lane occupancy.

18. The non-transitory computer-readable medium of claim 16, wherein the one or more instructions, when executed by the one or more processors, further cause the one or more processors to:
determine, based on a total quantity of the plurality of vehicles, which includes the first quantity of vehicles and the second quantity of vehicles, that the plurality of vehicles occupy the threshold capacity of the section.

19. The non-transitory computer-readable medium of claim 15, wherein the traffic data includes image data corresponding to images of the section, and
wherein the one or more instructions, that cause the one or more processors to determine the vehicle information, further cause the one or more processors to:
determine the vehicle information using an image processing model,
wherein the image processing model is to:
analyze the image data to identify the first lane data,
wherein the first lane data corresponds to first portions of the images, wherein the first portions depict the first lane;
determine the first quantity of vehicles based on the first portions,
wherein the image processing model is trained to detect one or more types of vehicles; and
generate the first vehicle information by mapping the first quantity of vehicles to an identifier of the first lane.

20. The non-transitory computer-readable medium of claim 15, wherein the one or more instructions, that cause the one or more processors to perform the action, cause the one or more processors to at least one of:
cause the target vehicle to enter the target lane based on the navigation instructions,
wherein the target vehicle is an autonomous vehicle;
cause the navigation instructions to be displayed via a user interface associated with the target vehicle;
cause a first vehicle, of the plurality of vehicles, to exit the target lane to permit the target vehicle to travel in the target lane based on the navigation instructions,
wherein the first vehicle is an autonomous vehicle; or
cause other navigation instructions to be displayed via a user interface of a second vehicle, of the plurality of vehicles, in the target lane,
wherein the other navigation instructions indicate that the second vehicle is to exit the target lane to permit the target vehicle to travel in the target lane based on the navigation instructions.

* * * * *